Jan. 2, 1968  R. C. DAYMON  3,361,248
FIELD CONVEYOR
Filed Oct. 24, 1966  2 Sheets-Sheet 1
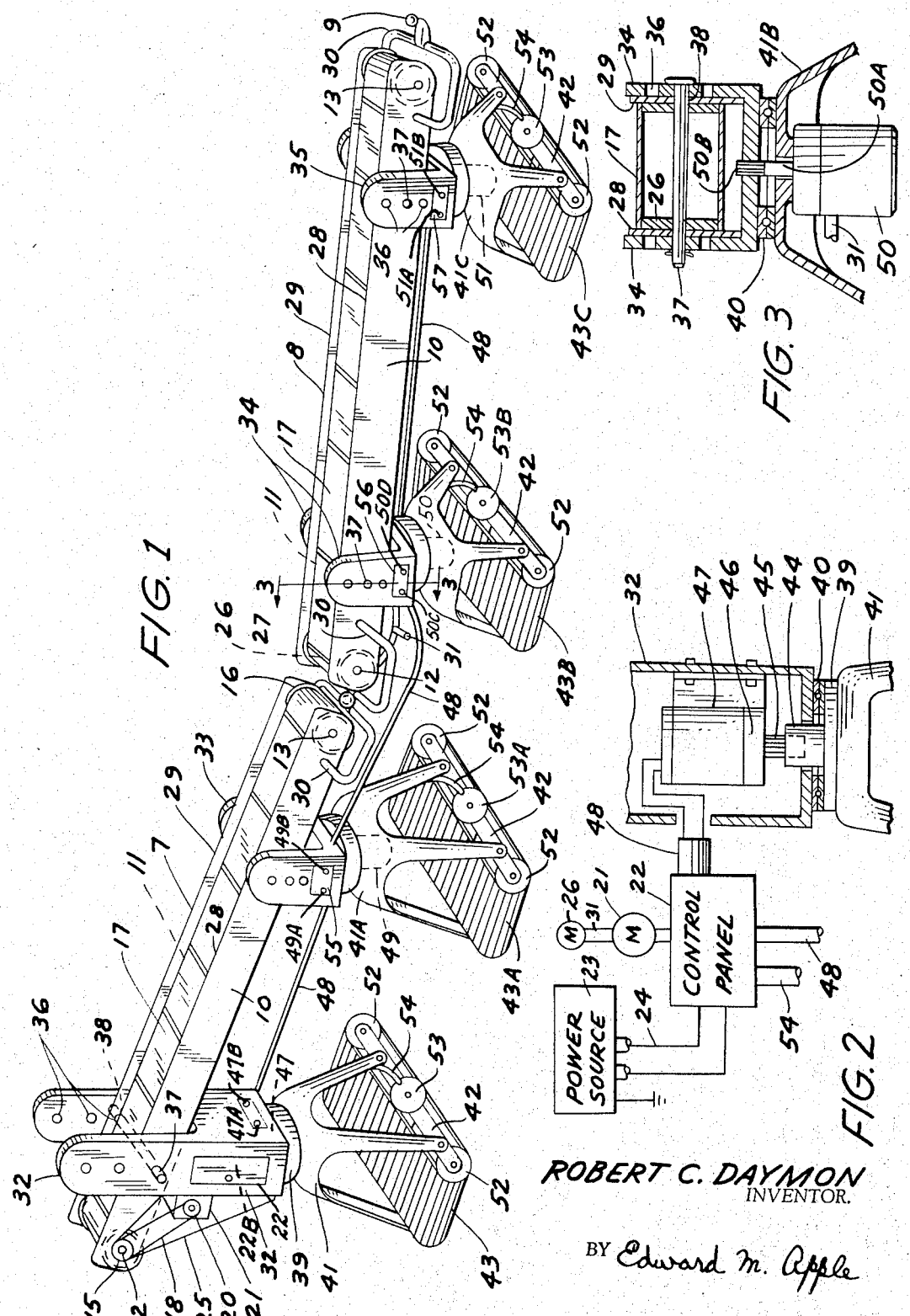
ROBERT C. DAYMON
INVENTOR.
BY Edward M. Apple
ATTORNEY

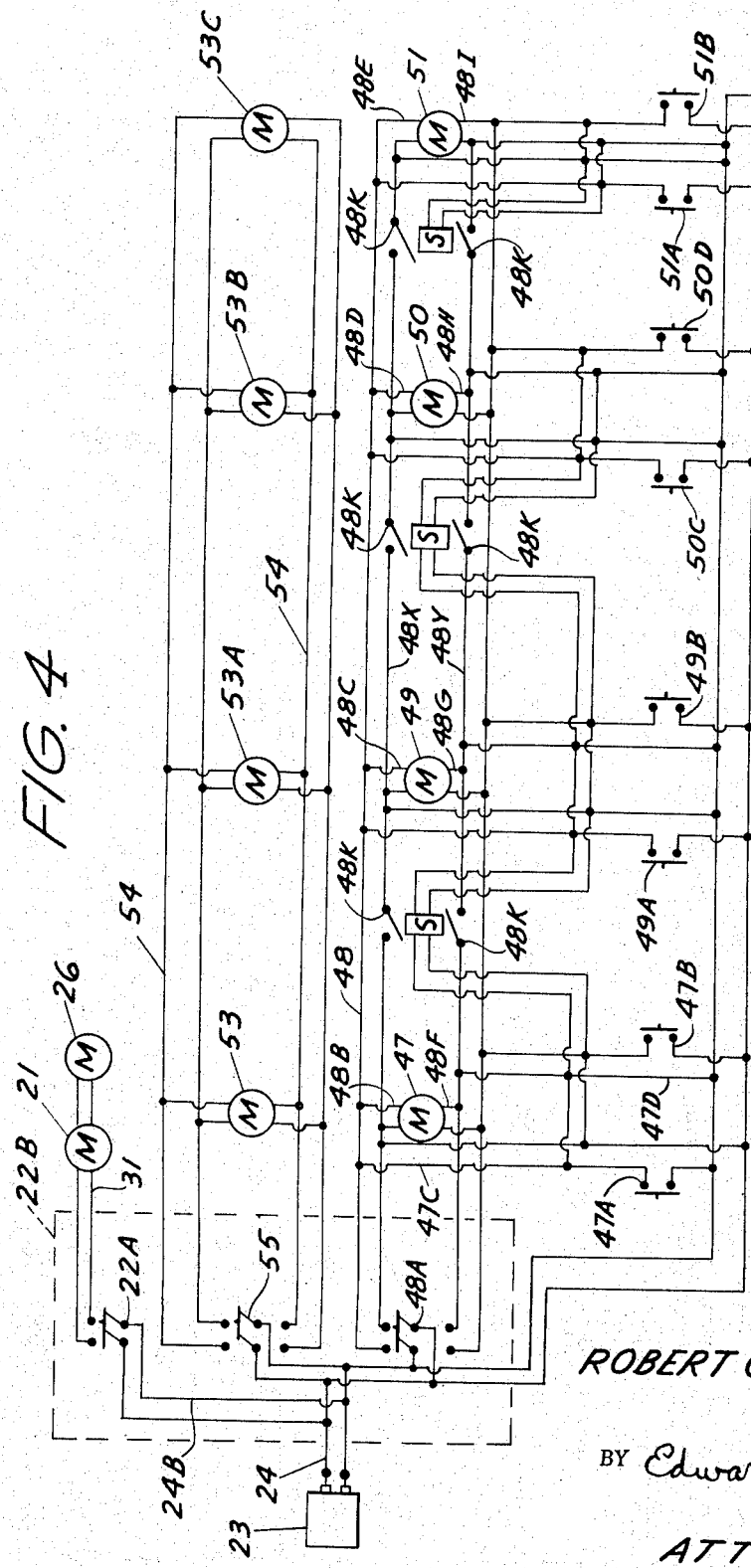

United States Patent Office 3,361,248
Patented Jan. 2, 1968

3,361,248
FIELD CONVEYOR
Robert C. Daymon, 7450 Weller Road,
Gregory, Mich. 48137
Filed Oct. 24, 1966, Ser. No. 588,802
10 Claims. (Cl. 198—92)

ABSTRACT OF THE DISCLOSURE

This application discloses a conveyor for loading vehicles from a harvest field. The invention resides in the provision of a multisection, articulated conveyor, each section being provided with power driven pivot means for one hundred and eighty degree horizontal movement, power driven propulsion means in the form of endless tracks, and control means for operating the drive means in unison or separately.

---

This invention relates to conveyors and has particular reference to a multiple section conveyor, with endless track propulsion means for moving the integrated conveyor, or the individual sections thereof, over a field being harvested.

In harvesting agricultural crops it is the common practice to move on to the field being harvested the heavy harvesting and transporting equipment, such as tractors, trailers and trucks, so that the harvested product may be hauled to storage, or to market.

The present method of loading trucks and trailers in the field is inefficient, slow and uneconomical and results in considerable damage to the field by the packing down of the soil and the formation of ruts and holes by the wheels of the heavy hauling equipment. This hinders further growth of the crops and necessitates the reworking and reseeding of the soil at great expense.

It is therefore an object of this invention to obviate the foregoing difficulties.

Another object of the invention is to provide a multiple section conveyor with self-propulsion means and control means for all sections, one of which is a master control for all sections located on one section.

Another object of the invention is the provision of a multiple section conveyor, each section of which has an endless conveyor belt and drive means and two endless propulsion tracks, each with drive means, and master means on one of the sections for controlling all of the drive means for said conveyor belts and propulsion tracks, and means on each section for individually controlling the drive means of that section.

Another object of the invention is to provide a multiple section conveyor, each section of which has an endless conveyor belt, with means for raising and lowering said belt, an endless propulsion track, and pivotable support means.

Another object of the invention is to provide a device of the character indicated which is adapted for transporting material from any point in a field to the perimeter of the field for loading, thereby eliminating the necessity of moving on to the field heavy transporting equipment, such as a tractor, trailer or truck.

Another object of the invention is to provide a device for removing, in an economical manner, harvested crops and the like, from a field with a minimum of labor, and with a considerable saving of time, and with a minimum of damage to the product or material being handled.

Another object of the invention is the provision of a device of the character indicated which is constructed with means for transporting the integrated sections of the device in any direction over a field, and in such a manner that the conveyor is always in a position so that it may be most effectively used.

Another object of the invention is to provision of a device of the character indicated which is provided with support and propulsion means which may be effectively used in a field which is being harvested without compacting the soil of the field and without leaving indentations in the soil which would subsequently have to be corrected.

Another object of the invention is to provide a conveyor which is constructed and arranged for elevating and conveying a harvested product into position for loading on to a truck, trailer, or other device which is positioned off of the field and along the perimeter of the field.

Another object of the invention is to provide a multiple section conveyor which is constructed with means for the self-propulsion of the device, whereby the integrated sections may be moved as a unit, or the sections may be moved individually, in any direction of the compass.

Another object of the invention is to provide a multiple section conveyor with means on each conveyor for retaining thereon the material being handled by the conveyor.

The foregoing and other objects and advantages of the invention will become more apparent as the description proceeds, reference being made from time to time to the accompanying drawing, forming part of the within disclosure, in which drawing:

FIG. 1 is a perspective view of a device embodying the invention.

FIG. 2 is a schematic view illustrating certain of the electrical circuits.

FIG. 3 is a section taken substantially on the line 3—3 of FIG. 1 and illustrates one of the support members with the turning motor mounted below instead of above the turn table.

FIG. 4 is a schematic view of the electrical circuits and controls embodied in the device.

Referring now more particularly to the drawing it will be understood that in the embodiment herein disclosed the reference characters 7 and 8 indicate, in general, two of the sections comprising the conveyor.

It will be understood that one or more additional sections may be added by means of ball joint 9.

Each section 7 and 8 is fabricated of aluminum, or other light metal, each section having side members 10 and 11, which are joined by cross members (not shown). The side members 10 and 11 of each section support spindles 12 and 13, on which spindles rotate rollers 15 and 16, over which pass an endless belt 17.

The endless belt 17 of the section 7 is driven through the spindle 12 by means of chains 18 and sprockets 19 and 20, which in turn are driven by a gear reduction motor 21, which is controlled through a switch 22A on a panel 22B behind the cover member 22 (FIGS. 1 and 2), which switch 22A in turn is connected to a power source 23 through the electrical circuits 24B and 24. The power source 23 may be a conventional engine driven generator or it may be an outlet box connected to a commercial electric line.

The spindle 12 and the drive mechanism of section 7 (FIG. 1) is supported on a bracket 25.

Although I have illustrated the motor 21 as being removed from the roller 15, it will be understood that in some applications I may prefer to mount the motor 21, with its reduction gear, on the inside of the roller 15.

The remotely mounted gear reduction motor 21 (FIG. 1) may be used to drive, in common, the endless belts 17 of each section 7 and 8, and any additional section that may be added thereto, by connecting the adjacent end rollers of each section by means of chains and sprockets (not shown).

In the embodiment shown in FIG. 1 the endless belt 17 of the section 7 is driven by the gear reduction motor 21, and the endless belt 17 of the section 8 is driven by a separate gear reduction motor 26, which is mounted on the interior of the roller 27. The motors 21 and 26, and the drive motors of the endless belts of any added sections are all controlled through the master panel 22B, positioned on section 7 and the connecting electrical cable 31 (FIGS. 1, 2, and 4).

In order to provide height adjusting means for the conveyor sections 7 and 8, I provide the bifurcated supports 32, 33, 34 and 35, with a plurality of spaced apertures 36, which are arranged to receive support pins 37, which are arranged to extend through openings 38 formed in the side members 10 and 11.

In FIGS. 1 and 2, I illustrate the bifurcated support member 32 mounted on a turn table 39, from which it is separated by means of ball bearings 40 (FIG. 2). As shown in FIG. 1 the turntable 39 is supported by means of legs 41, which in turn are supported by side rails 42, comprising part of an endless track assembly 43. The turnable 39 has a hub 44 (FIG. 2), which has internal means for receiving the splined shaft 45, which is rotated through gear box 46 by an electric motor 47. The motor 47 is connected to the master control panel 22B (FIGS. 1, 2, and 4) through the electric cable 48, which cable 48 is also connected to the gear reduction motors 49, 50 and 51 mounted beneath the support members 33, 34 and 35, as hereinafter described.

It will be noted that the motors 49, 50 and 51 (FIGS. 1 and 3) are positioned beneath the support members 41A, 41B and 41C instead of above the support members, as shown in FIG. 2. This is done to conserve space.

The motors 47, 49, 50 and 51 (FIG. 4) are all reversible and are controlled controlled by means of the switch 48A on the control panel 22B through the cable 48, so that they may be operated in unison in either direction. When the switch 48A is thrown upwardly, it closes the circuit through lines 48B, 48C, 48D and 48E to energize the motors 47, 49, 50 and 51 in one direction and when the switch 48A is thrown downwardly, it closes the circuit through the lines 48F, G, H, I, to energize the motors 47, 49, 50 and 51 in the opposite direction. When the switch 48A is in the position shown in FIG. 4, all circuits to the motors 47, 49, 50 and 51 are opened. I also provide push button switches 47A and 47B (FIGS. 1 and 4) and circuits 47C and 47D for individually controlling the rotation of the motor 47 in either direction. The motors 49, 50, and 51, each likewise may be separately operated in either direction by means of the push button switches 49A, 49B, 50C, 50D, 51A and 51B, through their connecting circuits as shown in FIG. 4.

In order to close the circuits to the other motors, when any one of the motors 47, 49, 50 and 51 is being energized separately, I provide circuit breakers 48K in the lines 48X and 48Y, each of which circuit breakers 48K is operated by a solenoid S. The solenoids S and circuit breakers 48K are arranged in the circuits (FIG. 4) so that the lines 48X and 48Y are opened when any one of the push buttons 47A, 47B, 49A, 49B, 50C, 50D, 51A and 51B is closed.

As shown in FIG. 3 the reduction gear motor 50 will cause rotation between the support members 34 and 41B by means of a shaft 50A and gears 50B.

Although I have described the means for rotating the support members 34 and 41B, it will be understood that the support members 33 and 35 and their associated elements will be rotated in like manner.

By means of the motors 47, 49, 50 and 51, the travel of the conveyor assembly over the gound may be directed to any position of the compass.

The endless tracks 43, 43A, 43B and 43C pass over suitable rollers 52 mounted in the frame members 42. Each endless track 43, 43A, 43B and 43C is respectively driven by means of a reversible gear reduction motor 53, 53A, 53B and 53C, all of which are controlled by a master switch 55 on the control panel 22B through the cable 54 (FIGS. 1, 2, and 4) so that all of the endless tracks 43, 43A, 43B and 43C may be operated in a uniform direction and at a uniform speed.

As shown in FIG. 4, when the switch 55 is thrown upwardly, the motors 53, 53A, 53B, 53C and tracks 43, 43A, 43B, and 43C will rotate in one direction and when the switch 55 is thrown downwardly, the motors and tracks will rotate in the opposite direction. When the switch 55 is in the position shown in FIG. 4, the circuits to the motors 53, 53A, 53B, and 53C will be open.

From the foregoing description it will be seen that I have disclosed an articulated, sectional conveyor system which may be actuated, controlled and moved over the ground in any direction as an assembly, or in individual sections.

It is believed that the operation of the device is obvious from the foregoing description.

Having described my invention, what I claim and desire to secure by Letters Patent is:

1. A device of the character described comprising in combination, a plurality of substantially similar articulated sections, each of which is provided with an endless conveyor belt, means to drive the belt, support means pivotable one hundred and eighty degrees about a vertical axis and including, an endless track for moving the section over the ground, drive means for pivoting said support means, drive means for moving said track and control means for said drive means.

2. The structure of claim 1, in which each section has ball and socket means thereon for connecting it to another section.

3. The structure of claim 1, in which each section has adjustable means thereon including a perforated member and locking rod for elevating and lowering its endless belt.

4. The structure of claim 1, in which each section has a support member near each end, each said support member being in turn supported by an endless track assembly, said endless track assembly being pivotable about an axis vertical to said section.

5. The structure of claim 1, in which each section has a support member near each end, each said support member being mounted on an endless track assembly, power means to drive said endless track assembly and control means for said drive means, said endless track assembly and said support member being pivotable about an axis vertical to said section.

6. The structure of claim 1, in which said support means include a bi-furcated member for receiving an endless conveyor belt assembly, a turn table supporting said bi-furcated member, a multi-legged member supporting said turn table, and an endless track assembly supporting said last member.

7. The structure of claim 6, including means on said bi-furcated member for controlling the means for pivoting said support means.

8. The structure of claim 6, in which the said bi-furcated member is provided with a plurality of apertures for receiving a locking rod, a locking rod received in said apertures and supporting said endless belt assembly received in said bi-furcated member.

9. The structure of claim 1, in which one of said sections has individual means thereon for controlling the drive means of that section and master means for controlling the drive means of all sections.

10. The structure of claim 1, in which one of said sections has power generating means thereon for operating all of said drive means, means for controlling the drive means of that section and master means for controlling the transport drive means of all sections.

References Cited

UNITED STATES PATENTS

| 1,153,851 | 9/1915 | Menzies | 198—92 |
| 2,764,278 | 9/1956 | Mercier | 198—36 |
| 3,265,192 | 8/1966 | Stadelman | 198—204 |

FOREIGN PATENTS 939,980  3/1956  Germany.

RICHARD E. AEGERTER, *Primary Examiner.*